United States Patent
Collins et al.

(10) Patent No.: US 11,675,774 B2
(45) Date of Patent: Jun. 13, 2023

(54) REMOTE POLICY VALIDATION FOR MANAGING DISTRIBUTED SYSTEM RESOURCES

(71) Applicant: Amazon Technologies, Inc., Seattle, WA (US)

(72) Inventors: Brian Collins, Seattle, WA (US); Zachary Mohamed Shalla, Seattle, WA (US); Marvin Michael Theimer, Seattle, WA (US); John Petry, Seattle, WA (US); Michael Hart, Seattle, WA (US); Serge Hairanian, Newcastle, WA (US); Anders Samuelsson, Redmond, WA (US); Salvador Salazar Sepulveda, Seattle, WA (US); Ji Luo, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 475 days.

(21) Appl. No.: 15/275,219

(22) Filed: Sep. 23, 2016

(65) Prior Publication Data
US 2018/0089249 A1    Mar. 29, 2018

(51) Int. Cl.
*G06F 16/23*    (2019.01)
*G06F 16/28*    (2019.01)
(Continued)

(52) U.S. Cl.
CPC ........ *G06F 16/2365* (2019.01); *G06F 16/282* (2019.01); *H04L 41/0894* (2022.05); *H04L 67/1095* (2013.01)

(58) Field of Classification Search
CPC .............. G06F 17/30; G06F 17/30371; G06F 17/30589; G06F 16/2365; H04L 41/12;
(Continued)

(56) References Cited

U.S. PATENT DOCUMENTS

| 5,737,559 | A | 4/1998 | Orton et al. |
| 5,940,839 | A | 8/1999 | Chen et al. |

(Continued)

FOREIGN PATENT DOCUMENTS

WO    2012068488    5/2012

OTHER PUBLICATIONS

Markus Vilcinskas, "What is Azure Active Directory?", Retrieved from URL: https://azure.microsoft.com/en-us/documentation/articles/active-directory-whatis/, Updated Aug. 23, 2016, pp. 1-4.
(Continued)

*Primary Examiner* — Douglas B Blair
(74) *Attorney, Agent, or Firm* — S. Scott Foster; Kowert, Hood, Munyon, Rankin & Goetzel, P.C.

(57) ABSTRACT

Distributed system resources may be managed by applying user created policies to the resources. To ensure that valid policies are applied, remote validation for the policies may be implemented. A validation event for a policy may be detected. A remote validation agent may be identified for the policy and a validation request sent to the remote validation agent that includes information for validating the policy. The remote validation agent may return a validation result for the policy. If valid, a policy action that triggered the remote validation event for the policy may be allowed. If invalid, the policy action that triggered the remote validation event for the policy may be denied.

20 Claims, 12 Drawing Sheets

(51) Int. Cl.
*H04L 41/0894* (2022.01)
*H04L 67/1095* (2022.01)

(58) Field of Classification Search
CPC ..... H04L 41/22; H04L 41/022; H04L 41/046; H04L 41/0213; H04L 41/0803; H04L 41/0856; H04L 41/5054; H04L 67/1095; H04L 67/1097; H04L 41/0806; H04L 41/0894
See application file for complete search history.

(56) References Cited

U.S. PATENT DOCUMENTS

| | | |
|---|---|---|
| 6,272,488 B1 | 8/2001 | Chang et al. |
| 6,421,658 B1 | 7/2002 | Carey et al. |
| 6,510,420 B1 | 1/2003 | Cessna et al. |
| 6,523,032 B1 | 2/2003 | Sunkara et al. |
| 6,625,602 B1 | 9/2003 | Meredith et al. |
| 6,826,570 B1 | 11/2004 | Eshel et al. |
| 6,947,951 B1 | 9/2005 | Gill |
| 6,957,230 B2 | 10/2005 | Cameron et al. |
| 7,136,867 B1 | 11/2006 | Chatterjee et al. |
| 7,159,125 B2 | 1/2007 | Beadles et al. |
| 7,231,384 B2 | 6/2007 | Wu et al. |
| 7,246,128 B2 | 7/2007 | Jordahl |
| 7,305,419 B1 | 12/2007 | Cosby et al. |
| 7,383,285 B1 | 6/2008 | Pal et al. |
| 7,620,647 B2 | 11/2009 | Stephens et al. |
| 8,248,958 B1* | 8/2012 | Tulasi ............... H04L 43/50 370/250 |
| 8,275,836 B2 | 9/2012 | Beaven et al. |
| 8,429,197 B1 | 4/2013 | Desai et al. |
| 8,863,299 B2 | 10/2014 | Sharma et al. |
| 8,880,664 B1* | 11/2014 | Tekle ............... H04L 41/0803 709/223 |
| 9,684,527 B1* | 6/2017 | Hayward ........... G06F 9/44505 |
| 9,823,937 B1* | 11/2017 | Hayward ........... G06F 9/44505 |
| 10,147,039 B1* | 12/2018 | Hayward ........... G06F 11/3051 |
| 10,454,786 B2 | 10/2019 | Collins et al. |
| 10,489,424 B2 | 11/2019 | Collins et al. |
| 10,545,950 B2 | 1/2020 | Collins et al. |
| 2003/0021283 A1* | 1/2003 | See ................ H04L 41/046 370/401 |
| 2003/0226131 A1* | 12/2003 | Li ............... G06F 8/33 717/110 |
| 2004/0064527 A1* | 4/2004 | Brunet ............... H04L 41/0213 709/218 |
| 2004/0225988 A1 | 11/2004 | Petunin et al. |
| 2006/0149408 A1* | 7/2006 | Speeter ............ G06F 8/71 700/126 |
| 2009/0132557 A1 | 5/2009 | Cohen et al. |
| 2009/0172771 A1* | 7/2009 | Soulhi ............... H04L 41/0893 726/1 |
| 2009/0241104 A1 | 9/2009 | Amiga et al. |
| 2010/0023520 A1 | 1/2010 | Barboy et al. |
| 2010/0088334 A1 | 4/2010 | Wasserman et al. |
| 2012/0084325 A1 | 4/2012 | Bansode et al. |
| 2012/0150912 A1 | 6/2012 | Ripberger |
| 2012/0198365 A1* | 8/2012 | Bornheimer ............ G06F 8/77 715/762 |
| 2013/0227637 A1* | 8/2013 | Nagarajan ............ G06F 21/31 726/1 |
| 2014/0101203 A1* | 4/2014 | Meunier ............ G06F 16/80 707/794 |
| 2014/0237550 A1* | 8/2014 | Anderson ............ H04L 63/14 726/3 |
| 2014/0280961 A1* | 9/2014 | Martinez ............ H04L 41/5054 709/226 |
| 2015/0248419 A1* | 9/2015 | Motoyoama .......... G06F 16/125 726/1 |
| 2016/0112497 A1* | 4/2016 | Koushik ............ H04L 67/10 726/7 |
| 2016/0269373 A1 | 9/2016 | White et al. |
| 2016/0283540 A1 | 9/2016 | Barber et al. |
| 2018/0115467 A1* | 4/2018 | Li ............... H04W 4/70 |
| 2020/0249977 A1* | 8/2020 | Mentz ............ G06F 9/45558 |

OTHER PUBLICATIONS

Markus Vilcinskas, "What is Azure Active Directory?", Retrieved from URL: https://azure.microsoft.com/en-us/documentation/articles/active-directory-whatis/, Published on Aug. 23, 2016, pp. 1-4.
U.S. Appl. No. 16/751,727, filed Jan. 24, 2020, Brian Collins.
U.S. Appl. No. 16/692,073, filed Nov. 22, 2019, Brian Collins.
Symantec Corporation, "E-security begins with sound security policies", Announcement Symantec, Dated Jun. 14, 2001, pp. 1-23.
International Search Report and the Written Opinion from PCT/US2017/052943, dated Dec. 14, 2017, pp. 1-6.

\* cited by examiner

US 11,675,774 B2

REMOTE POLICY VALIDATION FOR MANAGING DISTRIBUTED SYSTEM RESOURCES

BACKGROUND

Large systems with many users often require complex management schemes in order to ensure that both users and system components are appropriately utilized for performing operations. Instead of reconfiguring or redesigning system components each time changes in the appropriate actions or behaviors taken by system components on behalf of users are to be implemented, resource management systems have been developed to allow for the separate management of actions and behaviors that may be performed by system components. Access privileges, for instance, may be defined for one or multiple users with respect to certain system components in a resource management system so that when access requests from the users directed to the certain system components are received, the resource management system may indicate to the system components which requests may or may not be performed based on the defined access privileges. In this way, resource management systems reduce the costs associated with modifying or enforcing actions or behaviors of system components by reducing the number of changes that have to be implemented directly at system components. However, as the size of systems continues to increase, the ability of resource management systems to cope with growing numbers of system components in order to define and apply appropriate actions or behaviors for the system components may become less efficient without further capabilities to optimally manage system components.

Figure 1:
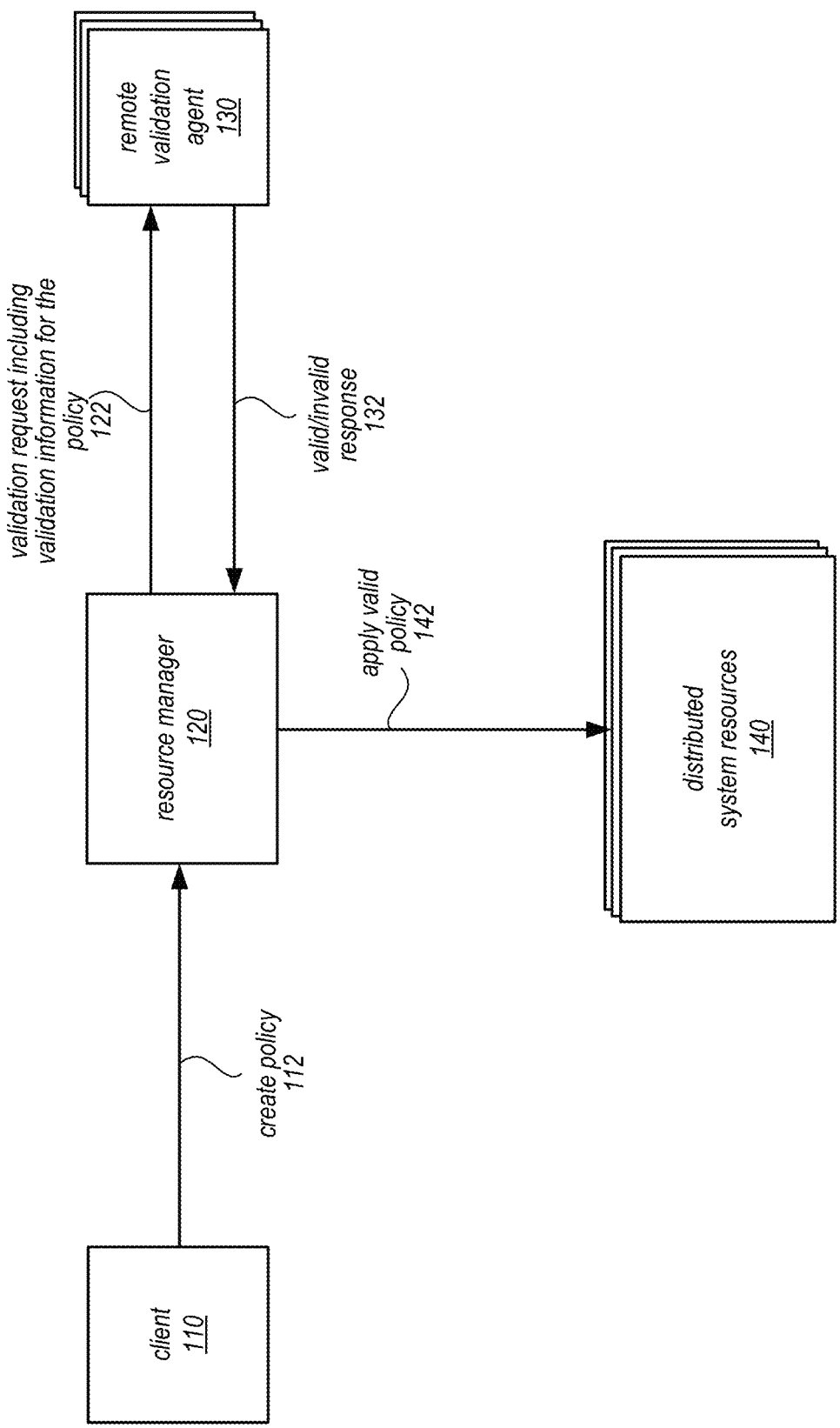
FIG. 1 is a logical block diagram illustrating remote policy validation for managing distributed system resources, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of remote policy validation for managing distributed system resources are described herein. Managing system resources often involves defining and enforcing the permitted actions, configurations, controls or any other definition of behaviors for the system resources that are described in respective policies applied to the system resources. For example, security policies, such as access rights or permitted actions for system resources, may be defined and enforced for users of the system resources. In various embodiments, data describing the resources of a system may be maintained that also describes these permitted behaviors. For example, data objects describing system resources may be maintained to identify policies that indicate the permitted behaviors for the system resources. In order to apply the same policies to multiple resource data objects, a hierarchy or structure of the resource data objects may be implemented. A tree structure, for instance, may be implemented that arranges the resource data objects in groups, directories, or other sets of resource data objects which apply those policies inherited along the path of the tree structure from the resource data object to the root of the tree structure. In this way, policies applied to parent nodes (e.g., the groups, directories, or other set of resource data objects) may be inherited and applied to child nodes (e.g., the resource data objects in the groups, directories, or sets).

As noted above, policies may be implemented in many different scenarios to manage system resources. Given both the variety of types of management actions, configurations, controls or other definition of behaviors for resources as well as the many different types of resources that may be managed, determining whether created or applied policies are valid can quickly become unmanageable. Typically, resource management systems provide a limited set of pre-defined policies which may be applied. However, a limited set of pre-defined policies may be unable to adapt to new or changing conditions, resources, or scenarios where policies could be applied to manage resources. For instance, large scale distributed systems, like provider network 200 discussed below with regard to FIG. 2, may offer hundreds of services and run thousands of resources on behalf of users, which may be configured and/or operated in large number of combinations. In various embodiments, remote policy validation may allow for a resource manager to host, apply, and manage all kinds of policies without any pre-defined policy sets or limitations. Instead, users of the resource manager may craft custom policies particular to the individual needs or desires of the system resources to be managed, as validation of the policies may be remotely performed by remote validation agents implemented, configured, controlled, or directed by the users.

FIG. 1 is a logical block diagram illustrating remote policy validation for managing distributed system resources, according to some embodiments. Distributed system resources 140 may be physical system resources, such as computing devices (e.g., servers), networking devices, or storage devices, or virtual system resources, such as user accounts, user data (e.g., data objects such as database tables, data volumes, data files, etc.), user resource allocations (e.g., allocated resource bandwidth, capacity, performance, or other usage of system resources as determined by credits or budgets), virtual computing, networking, and storage resources (e.g., compute instances, clusters, or nodes), or any other component, function or process operating in a distributed system. As discussed below, with regard to FIG. 5, these resources 140 may be represented as resource data objects to which policies are applied (e.g., mapping, link, or otherwise associating). A lookup operation may be performed, as discussed below with regard to FIG. 4, in order to determine which policies are associated with a given resource data object (e.g., by traversing a path that includes the resource data object).

Different policies may be created by be a client of the distributed system, such as client 110. To create a policy, client 110 may send one or more requests 112 to resource manager 120 to create and apply policies to distributed system resources. Prior to applying policies, resource manager 120 may ensure that the created/applied policies are valid, in various embodiments. Validating policies may include evaluating policies for syntactic errors and semantic errors. Syntactic errors may be errors that indicate the format or composition of a policy is incorrect when compared with a schema or other set of syntax rules for the policy. For example, syntactic errors may be identified when a policy fails to include a data field, modifier, or other term that signals the location of a policy attribute (e.g., resource identifier). Semantic errors may be errors that indicate whether the content of a policy that is meaningful, and thus enforceable. For example, a semantic error may occur when the policy identifies an operation to modify a resource that does not exist. The non-existent resource has no meaning, and therefore is a semantic error in the policy. Semantic validation may include validating based on business or operational logic or rules and thus may be specific to the policy type being validated.

As syntactic and semantic errors may vary from one policy to another, remote policy validation may allow for a remote validation agent, specifically configured to validate a specific policy or policies to perform syntactic or semantic validation, such as remote validation agent(s) 130. Resource manager 120 may identify remote validation agent(s) 130 according to the policy or policy type of the policy. For instance, a policy type for the policy may be determined so that a remote validation agent 130 that is associated with the policy type is identified. In some embodiments, remote validation agent(s) 130 may be implemented as part of a resource that consumes the policy (e.g. enforces the policy at runtime, such as enforcing access restrictions, configuring resource settings, or directing operations) and/or requests a policy lookup for a data resource object. Syntactic remote validation agents and semantic remote validation agents may be implemented separately, in some embodiments. The policy or policy type may specifically identify remote validation agent(s) 130 by including a network address or endpoint to which a validation request may be directed to (e.g., without any particular formatting or information for the policy) or may send the validation request to a pre-registered remote validation agent for the policy via an interface formatted to request and obtain certain information about the policy and whether the policy is valid.

Once identified, resource manager 120 may send a validation request 122 including information for the policy to remote validation agent(s) 130 to initiate validation. For example, the validation request 122 may include a copy of the policy, or portions of the policy, which remote validation agent(s) 130 may compare with a policy type schema for the policy. In some embodiments, remote validation agent(s) 130 may only receive an identification of a policy as part of validation information and remote validation agent(s) 130 may request further information (e.g., further validation content, such as data field values or a policy type schema) from resource manager 120 or other source(s) (not illustrated). Once validation result is reached, remote validation agents 130 may provide a valid/invalid response to resource manager 120. The invalid response may, in some embodiments, indicate the validation errors detected for policy, which may be provided to client 110 (or other associated client, not illustrated) for correction. Validated policies may be applied 142 to distributed system resources. For example, the policy may be attached, associated, or otherwise linked to one or multiple resources so that when certain resource actions are initiated, the policy directs or controls the actions.

Please note, FIG. 1 is provided as a logical illustration of remote validation for managing distributed system resources, and is not intended to be limiting as to the physical arrangement, size, or number of components, modules, or devices, implementing a resource manager, remote validation agents, client or clients or the number, type, or arrangements of distributed system resources.

The specification first describes an example of a provider network implementing multiple different resources as part of offering different services to clients of the provider network. The provider network may also implement a resource management service that remote validation of policies for managing provider network resources, according to various embodiments. Included in the description of the example resource management service are various aspects of the example resource management service along with the various interactions between the resource management service, other services in the provider network, and clients of the provider network. The specification then describes a flowchart of various embodiments of methods for remote policy validation for managing distributed system resources. Next, the specification describes an example system that may implement the disclosed techniques. Various examples are provided throughout the specification.

Figure 2:
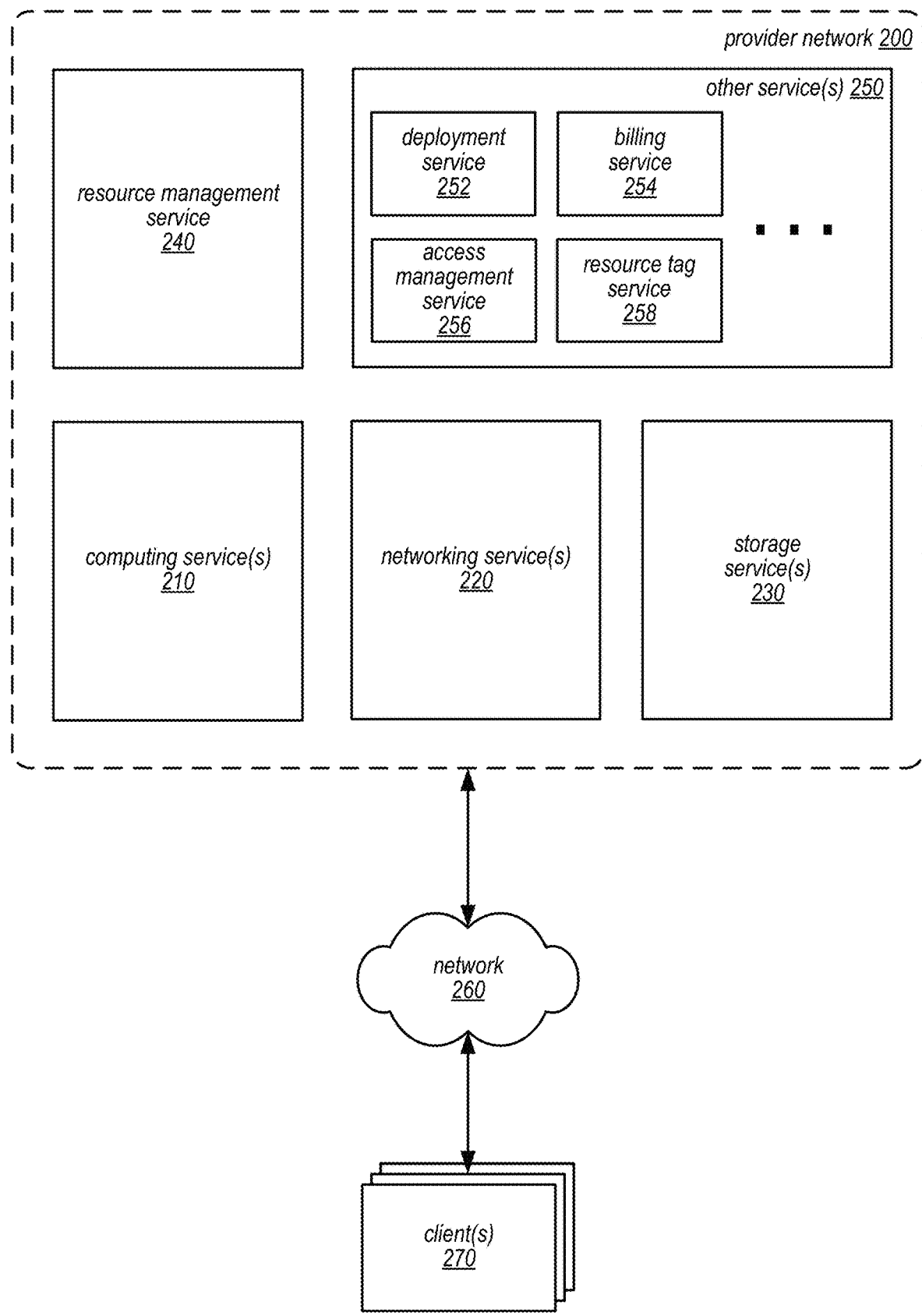
FIG. 2 is a logical block diagram illustrating a provider network that implements a resource management service that provides remote policy validation for managing provider network resources, according to some embodiments.

FIG. 2 is a logical block diagram illustrating a provider network that implements a resource management service that provides remote policy validation for managing provider network resources, according to some embodiments. Provider network 200 may be set up by an entity such as a company or a public sector organization to provide one or more services (such as various types of cloud-based computing or storage) accessible via the Internet and/or other networks to clients 270. Provider network 200 may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and services offered by the provider network 200. In some embodiments, provider network 200 may implement computing service(s) 210, networking service(s) 220, storage service(s) 230, resource management service 240 (which is discussed in detail below with regard to FIGS. 3-9), and/or any other type of network based services 250 (which may include various other types of storage, processing, analysis, communication, event handling, visualization, and security services as well as services for operating the services offered by provider network 200, including deployment service 252, billing service 254, access management service 256, and resource tag service 258). Clients 270 may access these various services offered by provider network 200 via network 260. Likewise network-based services may themselves communicate and/or make use of one another to provide different services. For example, various ones of computing service(s) 210, networking service(s) 220, storage service(s) 230, and/or other service(s) 250 may lookup policies applied to resource data objects in different hierarchies maintained as part of resource management service 240 describing resources in the services in order to enforce behaviors, actions, configurations, or controls indicated in the policies.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the resource management service or a component of the computing service) may be implemented by a particular node or may be distributed across several nodes. In some embodiments, a given node may implement the functionality of more than one service system component (e.g., more than one storage service system component).

Computing service(s) 210 may provide computing resources to client(s) 270 of provider network 200. These computing resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. In some embodiments clients 270 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 270 applications, without for example requiring the client 270 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Computing service(s) 210 may also provide server-less computational resources that allows clients to execute code, tasks, or other operations without provisioning or managing computing resources, like compute instances or servers. The code, tasks, or other operations may be automatically run in response to various events, such as modifications to or interactions with other provide network resources, such as the addition of data to a data store in data storage service. Automatic scaling, provisioning, configuring, and other operations to perform the code, tasks, or operations may be performed, leaving clients with the responsibility to design the code, tasks, or operations and identify appropriate events to trigger execution. In at least some embodiments, the computing service(s) 210 that provide server-less computational resources may execute validation code, tasks, or operations in response to validation requests or other events triggered for a policy in resource management service 240.

Networking service(s) 220 may implement various networking resources to configure or provide virtual networks, such as virtual private networks (VPNs), among other resources implemented in provider network 200 (e.g., instances of computing service(s) 210 or data stored as part of storage service(s) 230) as well as control access with external systems or devices. For example, networking service(s) 220 may be configured to implement security groups for compute instances in a virtual network. Security groups may enforce one or more network traffic policies for network traffic at members of the security group. Membership in a security group may not be related to physical location or implementation of a compute instance. The number of members or associations with a particular security group may vary and may be configured. For example, policies attached to associated resources and/or user accounts for a provider network may establish or provide the associations for resources and/or user accounts indicating membership in the security group.

Networking service(s) 220 may manage or configure the internal network for provider network 200 (and thus may be configured for implementing various resources for a client 270). For example, an internal network may utilize IP tunneling technology to provide a mapping and encapsulating system for creating an overlay network on network and may provide a separate namespace for the overlay layer and the internal network layer. Thus, in this example, the IP tunneling technology provides a virtual network topology; the interfaces that are presented to clients 270 may be attached to the overlay network so that when a client 270 provides an IP address that they want to send packets to, the IP address is run in virtual space by communicating with a mapping service (or other component or service not illustrated) that knows where the IP overlay addresses are.

Storage service(s) 230 may be one or more different types of services that implement various storage resources to provide different types of storage. For example, storage service(s) 230 may be an object or key-value data store that provides highly durable storage for large amounts of data organized as data objects. In some embodiments, storage service(s) 230 may include an archive long-term storage solution that is highly-durable, yet not easily accessible, in order to provide low-cost storage. In some embodiments, storage service(s) 230 may provide virtual block storage for other computing devices, such as compute instances implemented as part of virtual computing service 210. For example, a virtual block-based storage service may provide block level storage for storing one or more data volumes mapped to particular clients, providing virtual block-based storage (e.g., hard disk storage or other persistent storage) as a contiguous set of logical blocks. Storage service(s) 230 may replicate stored data across multiple different locations, fault tolerant or availability zones, or nodes in order to provide redundancy for durability and availability for access.

In some embodiments, storage service(s) 230 may include resources implementing many different types of databases and/or database schemas. Relational and non-relational databases may be implemented to store data, as well as row-oriented or column-oriented databases. For example, a database service that stores data according to a data model in which each table maintained on behalf of a client contains one or more items, and each item includes a collection of attributes, such as a key value data store. In such a database, the attributes of an item may be a collection of name-value pairs, in any order, and each attribute in an item may have a name, a type, and a value. Some attributes may be single valued, such that the attribute name is mapped to a single value, while others may be multi-value, such that the attribute name is mapped to two or more values.

In some embodiments, storage service(s) 230 may implement a hierarchical data storage service, such as hierarchical data store 350 in FIG. 3 discussed below. A hierarchical data storage service may store, manage, and maintain hierarchical data structures, such as a directory structure discussed below with regard to FIG. 5. Clients of a hierarchical data storage service may operate on any subset or portion of a hierarchical data structure maintained in the data storage service with transactional capability and/or may perform path-based traversals of hierarchical data structures. Such features allow clients to access hierarchical data structures in many ways. For instance, clients may utilize transactional access requests to perform multiple operations concurrently, affecting different portions (e.g., nodes) of the hierarchical data structure (e.g., reading parts of the hierarchical data structure, adding a node, and indexing some of the node's attributes, while imposing the requirement that the resulting updates of the operations within the transaction are isolated, consistent, atomic and durably stored). As discussed below, in at least some embodiments, the hierarchical data stored in a hierarchical data storage service may be hierarchies of resource data objects on behalf of resource management service 240.

In various embodiments, provider network 200 may implement various other service(s) 250, including deployment service 252. Deployment service 252 may include resources to instantiate, deploy, and scale other resources (from other network-based services, such as computing service(s) 210, networking service(s) 220, and/or storage service(s) 230) to implement a variety of different services, applications, or systems. For example, deployment service 252 may execute pre-defined deployment schemes which may be configured based, at least in part, on policies applied to resources launched by the deployment service 252 (e.g., a policy that describes the hardware and software configuration of virtual compute instance launched on behalf of particular user account).

Provider network 200 may also implement billing service 254 which may implement components to coordinate the metering and accounting of client usage of network-based services, such as by tracking the identities of requesting clients, the number and/or frequency of client requests, the size of data stored or retrieved on behalf of clients, overall resource bandwidth used by clients, class/type/number of resources requested by clients, or any other measurable client usage parameter. Billing service 254 may maintain a database of usage data that may be queried and processed by external systems for reporting and billing of client usage activity. Similar to deployment service 252, policies applied to resource data objects in hierarchies managed by resource management service 240 may indicate payment accounts, budgets, or responsible parties for which the usage data is to be reported and/or billed.

Provider network 200 may also implement access management service 256, which may implement user authentication and access control procedures defined for different resources (e.g., instances, user accounts, data volumes, etc.) as described by policies applied to resource data objects in hierarchies at resource management service 240. For example, for a given network-based services request to access a particular compute instance, provider network 200 may implement components configured to ascertain whether the client associated with the access is authorized to con-figured or perform the requested task. Authorization may be determined such by, for example, evaluating an identity, password or other credential against credentials associated with the resources, or evaluating the requested access to the provider network 200 resource against an access control list for the particular resource. For example, if a client does not have sufficient credentials to access the resource, the request may be rejected, for example by returning a response to the requesting client indicating an error condition.

Provider network 200 may also implement resource tag service 258, which may manage resource attributes for resources of other services (e.g., computing service(s) 210, networking service(s) 220, and/or storage service(s) 230). Resource attributes may be a tag, label, set of metadata, or any other descriptor or information corresponding to a provider network resource, implemented at one of various network-based services of the provider network. Attributes may be represented in various ways, such as a key-value pair, multiple values, or any other arrangement of information descriptive of the resource. Resource attributes for a resource may be maintained as part of resource metadata for the resources at network-based services. Network-based services may create resource metadata and/or attributes when a resource is created by a client. However, a client may wish to modify, remove, and/or add new resources attributes to the resource metadata in order to provide greater flexibility for automating various interactions within the resources utilizing resource metadata. Resource tag service 258 may lookup policies for different resources to determine which resource attributes are to be maintained for the different resources, in some embodiments.

Generally speaking, clients 270 may encompass any type of client configurable to submit network-based services requests to provider network 200 via network 260, including requests for directory services (e.g., a request to create or apply a policy, etc.). For example, a given client 270 may include a suitable version of a web browser, or may include a plug-in module or other type of code module configured to execute as an extension to or within an execution environment provided by a web browser. Alternatively, a client 270 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with network-based services platform 200. In some embodiments, client 270 may be configured to generate network-based services requests according to a Representational State Transfer (REST)-style network-based services architecture, a document- or message-based network-based services architecture, or another suitable network-based services architecture.

In some embodiments, a client 270 may be configured to provide access to network-based services to other applications in a manner that is transparent to those applications. For example, client 270 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 270 and the operating system or file system on behalf of applications executing within the operating system environment.

Clients 270 may convey network-based services requests (e.g., access requests directed to hierarchies in resource management service 240) to and receive responses from network-based services platform 200 via network 260. In various embodiments, network 260 may encompass any suitable combination of networking hardware and protocols necessary to establish network-based-based communications between clients 270 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and network-based services platform 200. It is noted that in some embodiments, clients 270 may communicate with network-based services platform 200 using a private network rather than the public Internet.

Figure 3:
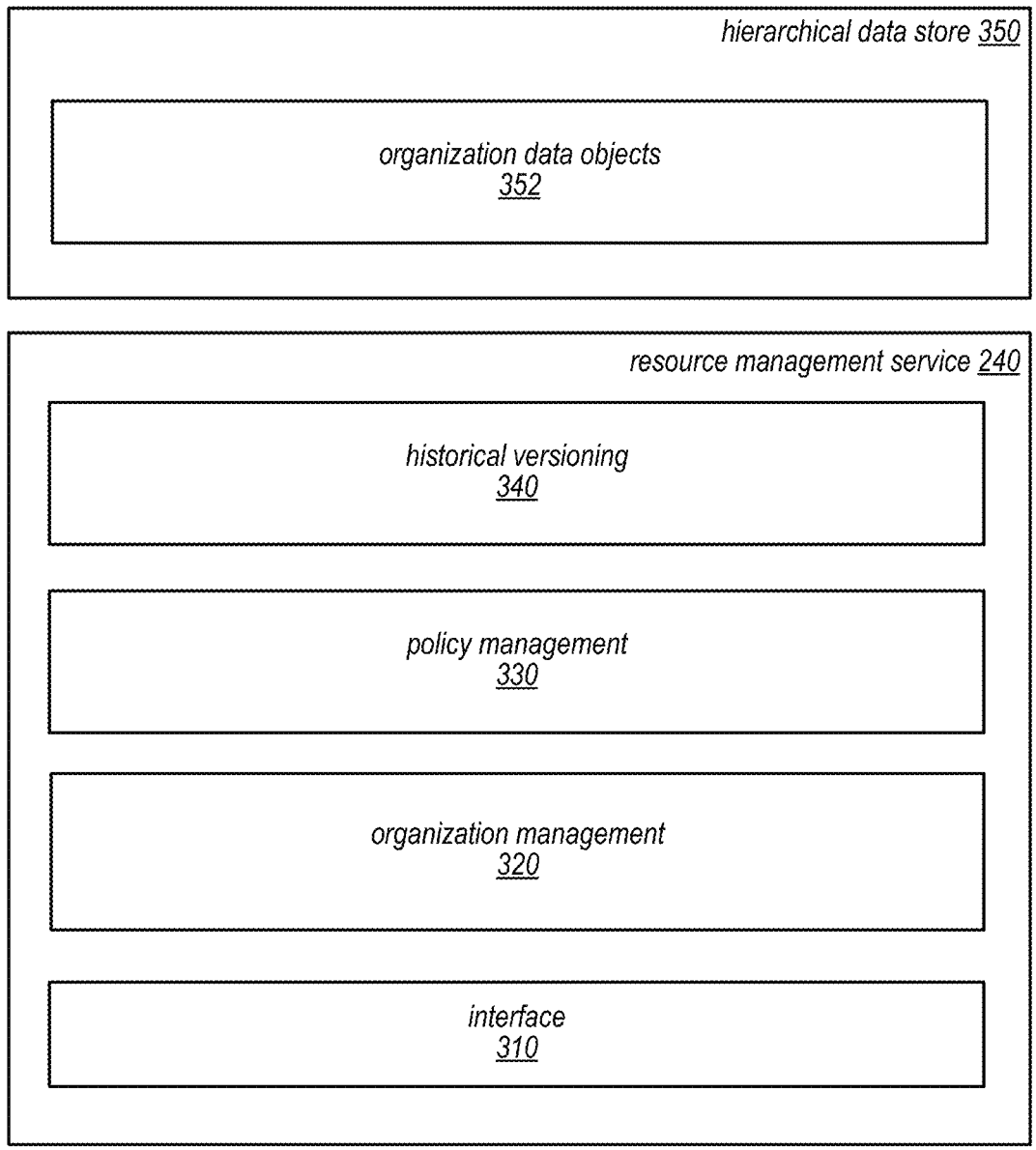
FIG. 3 is a logical block diagram illustrating a resource management service and a hierarchical data store, according to some embodiments.

FIG. 3 is a logical block diagram illustrating a resource management service and a hierarchical data store, according to some embodiments. Resource management service 240 may manage the application of policies to resource data objects for resources in provider network 200. As provider network 200 may offer services to a variety of different customers, a collection or set of resource data objects that are managed together may identified as an organization (although various other terms including entity, domain, or any other identifier for the collection of resource data objects may also be used). Resource management service 240 may provide various capabilities to clients of resource management service 240 to create and manage respective organizations which includes the resource data objects describing the resources of provider network 200 which are associated with one or more customers of the provider network, including managing which resource data objects (and thus their corresponding resources) are members of an organization). Resource management service 240 may allow for the creation and management of multiple different hierarchies of the resources in an organization. These resources may be further subdivided and assigned into groups (which also may be subdomains, directories, sub-entities, sets, etc.). Groups may consist of any resource that can have a policy applied to it. Resource management service 240 may allow clients to author policies and apply them to the organization, to different groups, or directly to resource data objects.

Resource management service 240 may implement interface 310, which may provide a programmatic and/or graphical user interface for clients to request the performance of various operations for managing system resources via an organization. For example, the various requests described below with regard to FIGS. 7-9 may be formatted according to an Application Programming Interface (API) and submitted via a command line interface or a network-based site interface (e.g., website interface). Other requests that may be submitted via interface 310 may be requests to create an organization, update an organization (e.g., by adding other resources, inviting other user accounts to join the organization. In some embodiments, an organization may be be treated as a resource owned or controlled by the user account that created it, and that account by default may have access permissions to the organization. The user account could then delegate permissions to other user accounts or users using cross-account access or transfer ownership of the organization, in cases where control needs to move to a delegated group or the owner needs to leave the organization.

Resource management service 240 may implement organization management 320, which may handle the creation of organizations, the updates to or modifications of organizations, the delegation of access permissions to organizations, as well as the arrangement of resource data objects within hierarchies maintained for the organization. For example, upon creation an organization may include a single hierarchy providing an arrangement of resource data objects (e.g., as members of various groups and/or groups within groups, etc.). Resource management 320 may handle the various requests to create additional hierarchies, update hierarchies, or delete hierarchies. Organization management 320 may also handle requests to add resource data objects to an organization. For example, organization management may identify which hierarchies a new resource data object should be added to and the location within the hierarchy that the resource data object should be added. In at least some embodiments, organization management may coordinate organization changes between multiple parties, such as adding user accounts to or removing user accounts from an organization and may implement multiparty agreement mechanisms to approve the change to the organization. For example, organization management 320 may facilitate an authenticated 2-way handshake mechanism to confirm or deny a potential change to an organization. Organization manager 240 may expose different mechanisms for multi-party agreements, including emailed invitations, single use tokens, and shared secrets (domains/passwords). When agreement is confirmed, organization management 320 may then perform the agreed upon changes to the organization.

Figure 6:
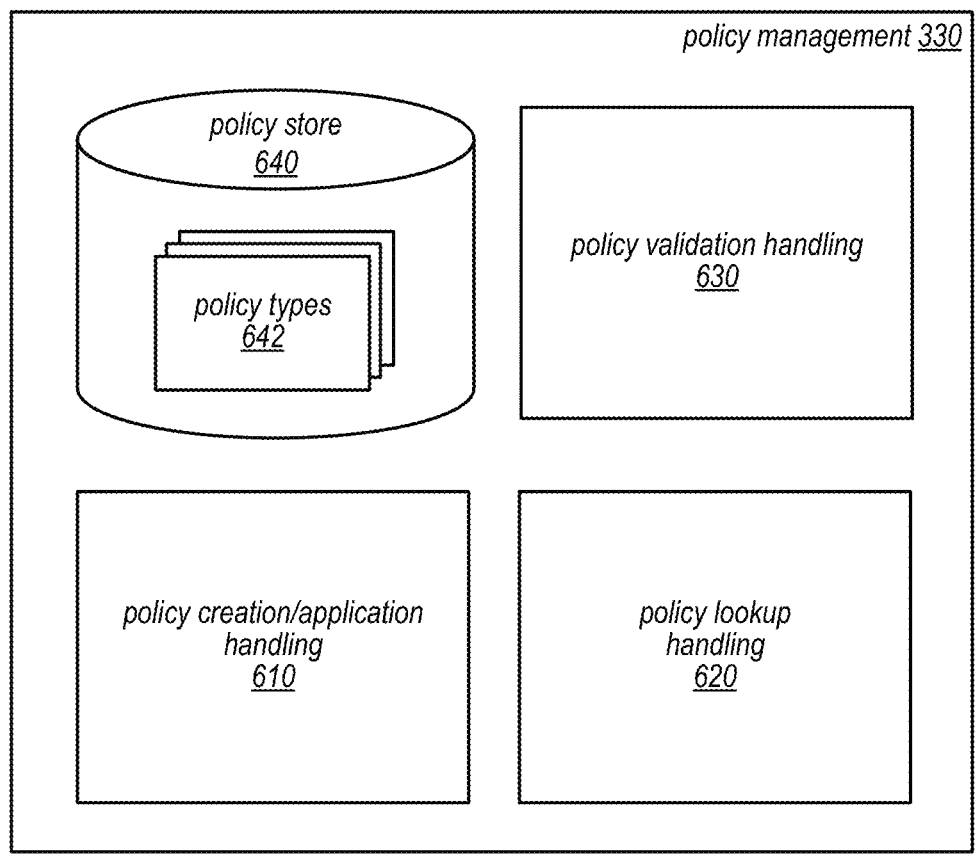
FIG. 6 is a logical block diagram illustrating a policy manager for resource management service policies applicable to provider network resources, according to some embodiments.

As noted above, policies may be authored or defined and then applied to various resource data objects, groups, or an entire hierarchy of an organization. Resource management service 240 may implement policy management 330 to handle the authoring of policies as well the application of policies. Many different types of policies may be applied in order to define different types of behaviors. Some policy types, for instance, may be related to specific behaviors, resources, or actors. Billing related policies, for instance, may have one or various types of billing policies. Resource configuration policy types (e.g., configuring operational configuration of resources, when deployed by deployment service 252 for instance. Some policy types can define access controls to resources. FIG. 6 discusses policy management 330 in further detail below. Policy management 330 may handle various requests to create an instance or policy of a policy type, define policy types by authoring a policy schema, and the application of policies to resource data objects, groups, or entire hierarchies within an organization, such as those requests discussed below with regard to FIGS. 7-9. Policy management 330 may also handle lookup requests for resource data objects, groups, or organizations and perform policy application and conflict resolutions, as discussed below with regard to FIG. 4.

Resource management service 240 may implement historical versioning of hierarchies in organizations, in some embodiments. Some services, such as billing service 254, may require the ability to query for historically versioned data, such as which account was the payer of the organization at the end of the previous month (as the current payer may be different due to a change to a hierarchy). In order to provide historical versions of hierarchies (including the policies applied and resource data objects arranged), historical versioning 340 may store prior versions or track or record changes to hierarchies. These prior versions or changes may be associated with particular points in time (e.g., by assigning timestamps). Historical versioning 340 may handle requests for policy lookups across particular ranges of time or at particular points in time. Historical versioning 340 may access the versioned data and return the appropriate policies for the specified time(s). Hierarchy versions may be stored as part of organization data objects 352 in hierarchical data store 350, in some embodiments.

Hierarchical data store 360 may provide data storage for organization data objects 362, including the resource data objects, policy data objects, and any other data describing the organization, including the multiple hierarchies of the resource data objects, as discussed below with regard to FIG. 5. The organization data objects 352 may be maintained within a single hierarchical data structure, though different hierarchies of resource data objects within the single hierarchical data structure may be provided for managing resource data objects, as discussed below with regard to FIG. 5.

Figure 4:
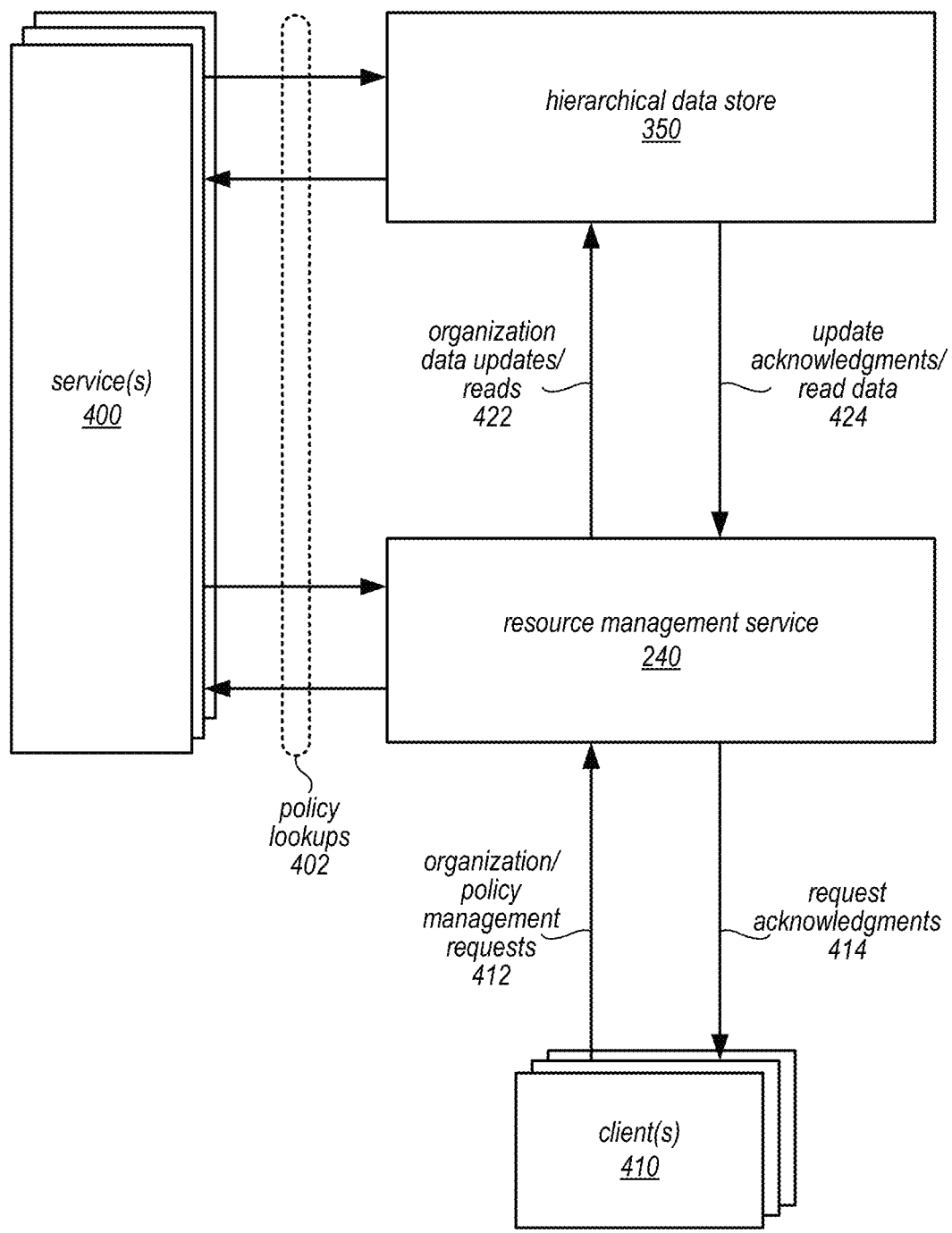
FIG. 4 is a logical block diagram illustrating interactions between clients and a resource management service and between a resource management service and other services, according to some embodiments.

FIG. 4 is a logical block diagram illustrating interactions between clients and a resource management service and between a resource management service and other services, according to some embodiments. As noted above, clients may interact with resource management service 240 to manage resources. For example, client(s) 410 may submit various organization/policy management requests 412 (e.g., to modify a hierarchy by arranging resource data objects or applying/removing policies). In turn resource management service 240, may identify the appropriate updates to organization data to be made or to be read, and send organization data updates/reads 422 to hierarchical data storage 350. Hierarchical data storage 350 may execute the received requests to change hierarchical data structures storing the organization data objects in accordance with the update request or retrieve the appropriate data read from the organization data objects according to the hierarchies, and return update acknowledgements/read data 424 to resource management service 240. In turn, resource management service 240 may return the appropriate acknowledgments (e.g., indicating success or failure of the requests.

Service(s) 400 may perform policy lookups 402 with respect to resource data objects corresponding to resources under the control or responsibility of service(s) 400, in various embodiments. For example, an access control service, such as access management service 256, may lookup the access policies for a particular resource (e.g., compute instance or user account) in order to permit or deny an access request. When launching new resources, network configuration information may be maintained in a policy that is applicable to the launched resource and may be retrieved by a policy lookup 402 from a service 400. Policy lookups 402 may be requested via resource management service 240 or, in some embodiments, may be requested directly from the service to the hierarchical data store 350. Latency sensitive services, for instance, may implement local libraries, agents, or interpreters for the organization data maintained at hierarchical data store 350 in order to reduce the number of requests that have to be sent in order to perform a policy lookup.

Figure 5:
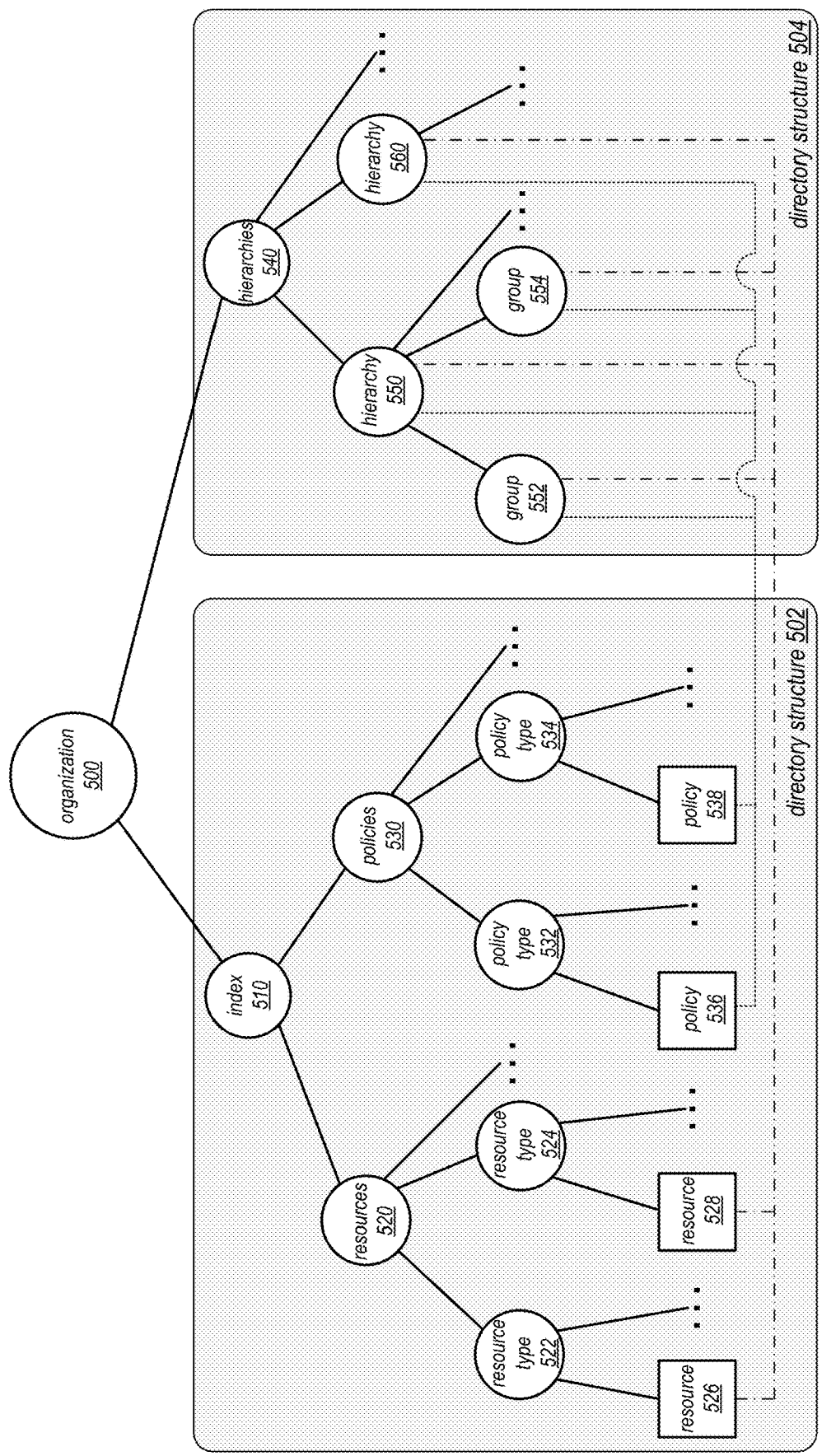
FIG. 5 is a logical illustration of directory structures that may store resource data objects and hierarchies of resource data objects in a hierarchical data store, according to some embodiments.

FIG. 5 is a logical illustration of directory structures that may store resource data objects and hierarchies of resource data objects in a hierarchical data store, according to some embodiments. Organization data objects (including policy data objects, resource data objects, groups or groups of groups of data objects) may be maintained in one or multiple directory structures, in various embodiments. For example, organization 500 may utilize directory structure 502 to store the resources and policies that are part of the organization. Index node 510 may provide information for performing a lookup to determine the location of a resource data object or policy data object. Resources node 520 may group resources into various resources types 522 and 524 (e.g., user accounts, virtual compute instances, storage volumes, VPNs, load balancers, etc.) and within the resource types 522 and 524 may be found resource data objects 526 and 528 describing individual resources in the provider network. Similarly, policies node 530 may include different policy types 532 and 534 (which may be created by clients as discussed above). Individual instances of the policy types 536 and 538 may be policy instances applied to resource data objects, groups, groups of groups, or hierarchies.

Organization 500 may also utilize directory structure 504 to maintain different hierarchies of resource data objects and policy data objects. Hierarchies node 540 may be the group of hierarchies maintained for organization 500, including hierarchy 550 and hierarchy 560. Within each hierarchy, groups, 552 and 554 or groups of groups, and/or any arrangement of resources included in the group of resources 520 may be linked (as illustrated by the dotted lines) to indicate membership in the group. Similar policies, such as policies 536 and 538 may be linked to hierarchies, groups or groups of groups, or individual resource data objects within the hierarchies.

Different types of hierarchical data structures, such as directory structures 502 and 504, may be stored, managed, and or represented in order to maintain organization 500. For example nodes in a hierarchy (e.g., the circle or square shapes) may have a globally unique identifier (GUID), zero or more attributes (key, value pairs), and zero or more links to other nodes. In some embodiments, a group or directory may be one type of node which has zero or more child links to other nodes, either groups/directories or resource data objects/policy data objects. Group nodes may have zero or one parent directory node, implying that directory nodes and links define a tree structure, in some embodiments, as depicted in FIG. 5. Index 510, hierarchies 540, resources 520, policies 530, hierarchy 550 and 560, resource type 522 and 524, policy type 532 and 534, and group 552 and 554 may be group/directory nodes. Node 500, organization node, may be a root node that is the logical root multiple directory structures and may not be visible to clients of resource management service (which may access individual hierarchies). Resource and policy nodes (represented by squares such as resource node) may be leaf nodes in a directory structure 510. Leaf nodes may have a unique external Id (e.g., client specified) and client-defined attributes. Leaf nodes can have more than one parent node so that resource data objects and policy data objects can be linked to multiple hierarchies. In some embodiments, all resource data objects are linked to all hierarchies (though in different arrangements as defined by a user), whereas in other embodiments, resource data objects may be linked to only some hierarchies.

In some embodiments, a link may be a directed edge between two nodes defining a relationship between the two nodes. There may be many types of links, such as client visible link types and another link type for internal hierarchical data store operation. In some embodiments, a child link type may create a parent—child relationship between the nodes it connects. For example, child link can connect resource type node 522 to resource 526. Child links may define the structure of directories (e.g., resources 520, policies 530, hierarchies 540). Child links may be named in order to define the path of the node that the link points to. Another type of client visible link may be an attachment link. An attachment link may apply a resource data object or policy data object to another node (e.g., group 552, hierarchy 550, etc.) as depicted by the dotted lines. Nodes can have multiple attachments. In some embodiments, some attachment restrictions may be enforced, such as a restriction that not more than one policy node (e.g., policy 536) of policy type 532 can be attached to a same node. A non-visible type of link or implied link type may also be implemented in some embodiments, a reverse link. Reverse links may be used for optimizing traversal of directory structures for common operations like look-ups (e.g., policy lookups).

In various embodiments, data objects or nodes in organization 500 can be identified and found by the pathnames that describe how to reach the node starting from the logical root node 500, starting with the link labeled "/" and following the child links separated by path separator "/" until reaching the desired node. For example, resource 526 can be identified using the path: "/index510/resources520/resource526". As some nodes may be children of multiple directory nodes, multiple paths may identify the node. For example, the following path can also be used to identify resource 526: "/hierarchies540/hierarchy550/group 552". Please note that the illustration in FIG. 5 provides many examples of the possible ways in which policy data objects or lease data objects may be linked. As noted earlier, not all policies may be attached to all hierarchies or all resource data objects to all hierarchies and thus the illustrated links are not intended to be limiting. Similar, directory structures may be differently arrange so that a single directory structure or greater number of directory structures are utilized.

FIG. 6 is a logical block diagram illustrating a policy manager for resource management service policies applicable to provider network resources, according to some embodiments. As discussed above, policy management 330 may handle policy creation, application, lookups, and validation for policies that are applied to resource data objects in an organization. Policy management 330 may implement policy/creation handling 610, in various embodiments, to process policy type and policy creation requests. Consider, a scenario where a client wants to introduce a new policy to allow various users of an organization in resource management service 240 to to establish a payer account that identifies a user account that is financial responsible for service charges incurred in provider network 200. The client may submit a request to create a new policy type named "Payer" and a new policy schema for the newly created policy type. The policy schema may be specified in various formats both human readable and/or machine readable, such as JSON or XML. Policy creation/application handling 610 may store the "Payer" policy type (e.g., by storing the associated schema and metadata, including version information for the schema) along with other policy types 642 in policy store 640. In some embodiments, the stored schema may identify a remote policy validation agent and whether the validation is performed synchronously or asynchronously with respect to a validation request.

Policy store 640 may persistently maintain policy types 642 by persistently maintaining the policy schemas and corresponding metadata for the policy schemas. Policy store 640 may be implemented as a database or otherwise searchable/query-able storage system to provide access to other components of policy management 330 or resource management 240. In some embodiments, policy store may be separately implemented from policy management 330 or resource management 240 (e.g., as part of a storage service 230). Because policy store 640 maintains metadata for policy types 642, policy creation application handling 610 may allow users to create new versions of policy schemas, identifying prior versions by schema version numbers. For instance, if after some testing, the client decides the newly created Payer policy type is not sufficient for their use case and decides to create a new version for it, the policy schema may be updated or replaced and the version number changed to indicate a later version (e.g., version 2.0). In some embodiments, multiple versions (associated with different version numbers) may be considered valid for policies, while clients may mark or indicate that some versions of a policy schema are obsolete (and should not be used).

Policy creation/application handling 610 may also handle requests to create an instance of a policy type, a policy. For example, another client may create a new Payer policy based on the Payer policy type. The other client can submit the appropriate policy content to populate the new policy (as discussed below with regard to FIGS. 7 and 9). In some embodiments, policy validation handling 630 may direct the performance of syntactic validation, either via a remote validation agent or through a remote validation agent implemented as part of policy management 330. If valid, the newly created policy may then be written as a new policy resource data object into the organization, as discussed above with regard to FIGS. 4 and 5.

Policy management 330 may implement policy lookup handling 620, in various embodiments, to handle lookup requests for policies (as discussed above with regard to FIG. 4). For example, policies can also be inherited in a chain from the organization down to a group, group of groups, or individual resource data object. If a policy is applied to a parent node in the hierarchy, then the child node (group, group of groups, or individual resource data object) may inherit the policy of the parent node. In this way, the policy applied to the parent node becomes the "default" policy, in the absence of any other policy applications. When there are multiple policies in the inheritance path, for example there is a policy applied at both the hierarchy and group level, then different policies may have different inheritance semantics, which may have to be resolved. In one scenario, access policies may follow the semantics of a set union, where ordering does not matter (e.g., everything is allowed unless explicitly excluded). Billing policies, in another scenario, may implement a "child wins/parent appends" inheritance model where a child policy may be executed, followed by a parent policy. In such scenarios, ordering of policies matters. Thus, policy lookup handling 620 may be configured to resolve conflicting policies according to the appropriate inheritance semantics for the policy.

In at least some embodiments, policy management 330 may implement policy validation handling 630 to direct syntactic and semantic validation of policies via remote validation agents. As noted earlier, validation of policies may include syntax validation. Syntax validation may evaluate whether a policy is syntactically correct with respect to the policy schema of the policy type for the policy so that the policy can be parsed and evaluated by backend systems that lookup the policy. Syntactic validation may be performed, in some embodiments, when authored, as discussed below with regard to FIG. 7. In addition to syntactic validation, some policies may undergo semantic validation. As noted above, semantic validation may be performed to ensure that policy content is meaningful, so that a resource or other information specified in the policy results in a policy that can be enforced. For example, semantic validation could determine whether a user account identifier specified in the "Payer" policy example discussed above is an account in the organization that has a valid payment instrument (e.g., a valid source of funds to pay for incurred expenses). Policy validation handling 630 may direct validation upon policy applications and resource or organization changes/modifications, in order to ensure that the changes do not invalidate policies that are applied within the organization. For example, validation of a modification to resource (e.g., a payer account leaving an organization or group) to ensure the modification does not invalidate the policy (e.g., that the payer account does not leave the organization or group without a valid payment instrument). As each policy may have different semantic validation logic, each policy may have a separately configurable remote validation agent.

In at least some embodiments, policy validation handling 630 may direct synchronous or asynchronous validation of policies. For example, a policy (or policy schema) may specify that validation for the policy is performed synchronously, so that the client that initiated the validation request (e.g., a client attempting to attach a policy or enforce a policy) waits for the validation result before continuing to operate. Whereas, for a policy (or policy schema) that specifies asynchronous validation, the client may not wait for the validation result to continue operating. In cases where asynchronous validation is performed (e.g., long running validations), policy validation handling 630 may track the state of validation for a policy (e.g., "Validation Request Submitted," "Validation Ongoing," "Validation Success," or "Validation Error") and may provide the state of the validation for the policy to the client in response to requests (e.g., the client may periodically poll for the state of the validation). In some embodiments, policy validation handling 630 may provide a recommendation to a policy creator (e.g., to a user account that created the policy) to change the policy validation behavior to synchronous or asynchronous depending on previous performance of validating the policy. For example, for validation of policies that are performed repeatedly (e.g., by a service or client that validates and then enforces or consumes the policy), a change in validation behavior may offer better performance (e.g., by not tying resources using synchronous behavior waiting for a long running policy validation or by using asynchronous behavior, spending time releasing and polling for validation state when the validation completes quickly).

Figure 7:
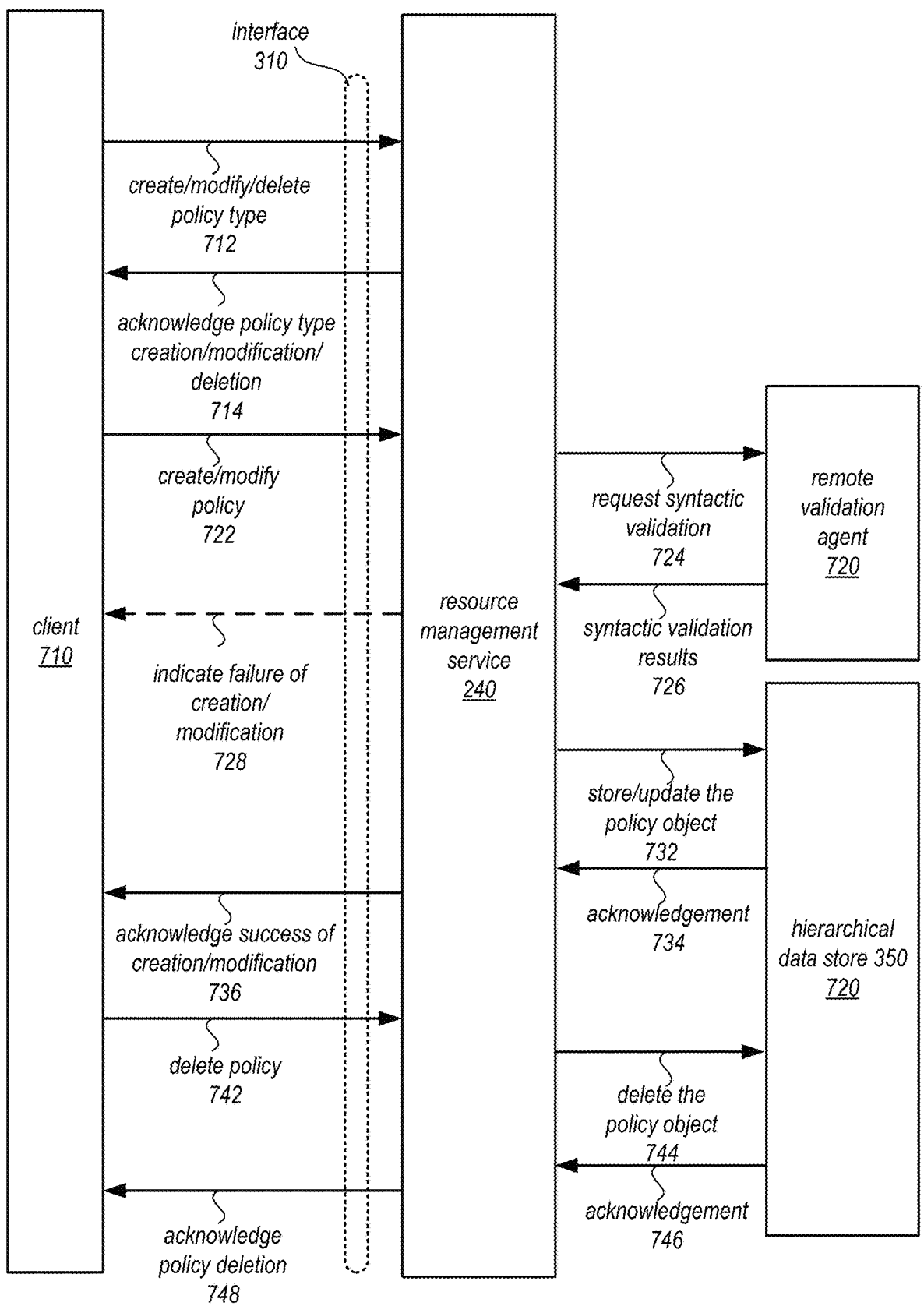
FIG. 7 illustrates interactions to manage policy types and policies in resource management service, according to some embodiments.

FIG. 7 illustrates interactions to manage policy types and policies in resource management service, according to some embodiments. Client 710, which may be a client 270 of provider network 200 as discussed above, may submit requests to resource management service 240 via interface 310. Interface 310 may provide an API for requests from client 710, which may be formatted and sent according to the API via a command line interface or graphical user interface, such as discussed below with regard to FIG. 9. As indicated at 712, client 710 may send a request to create, modify, or delete a policy type maintained at resource management service 240 (e.g., in policy store 640). To create or modify the policy type, a policy schema or changes to a policy schema may be specified (e.g., by including a schema data object or file). As noted above the policy schema may be described by a script or language which may define allowable structure and values for a policy type. Resource management service 240 may update the policy type in policy store 640 in accordance with request (e.g., creating a new policy type and storing the policy schema and related metadata, updating the policy schema and metadata, or deleting the policy schema and metadata). Resource management service 240 may then acknowledge the completion of the request 714.

Client 710 may send a request to create or modify a policy 722 to resource management service 240. The created or modified policy may be an instance of a policy type. Multiple policies may be created for a single policy type so that policies may be configured differently for application to resources in different circumstances. The creation request or update request 722 may include policy content that defines actions taken (or not taken) in certain conditions. For instance, the creation request may specify a new policy for a resource launch policy type to describe the actions to be taken when a compute resource is launched in the provider network (e.g., a condition describing the type of compute instance to be launched, configuration action(s) to take for the compute instance to be launched). In response to receiving a request to create/update a policy, resource management service 240 may request syntactic validation 724 from a remote validation agent 720. Remote validation agent 720 may be another resource implemented in the provider network, such as a virtual compute instance or server resource configured to handle validation requests from remote management service for the policy type. In at least some embodiments, the request for syntactic validation may include the policy schema for the policy (or remote validation agent 720 may maintain or separately request the policy schema from resource management service 240) and the policy content to be validated (or an identifier so that the policy content may be retrieved from resource management service 240). Remote validation agent 720 may perform a syntactic validation by comparing the policy content of the created/updated policy with the policy schema for the policy type to determine whether the policy content violates any of the allowed structure (e.g., ordering of data fields) or content (e.g., data types or resource types—such as allowing a storage resource to be specified when the policy schema describes a computing resource). Remote validation agent 720 may then provide syntactic validation results 726 to resource management service 240 (e.g., indicating that the policy is valid or that error(s) are detected—and possibly include the detected error(s)). If validation fails, then failure indication 728 may be provided to client 710. If the created/updated policy is valid, then resource management service 240 may store the new policy object or update the existing policy object 732 in hierarchical data store 350. Upon acknowledgment 734 of successfully storing/updating the policy object in hierarchical data store 350, resource management service 240 may then acknowledge the success of the creation or modification request 736.

Client 710 may send a request to delete a policy 742 to resource management service 240. Resource management service 240 may send a corresponding request 744 to delete the policy object from hierarchical data store 350. Upon acknowledgement 746 of successful deletion of the policy data object, resource management service 240 may send an acknowledgment of the policy deletion 748 to client 710.

Figure 8:
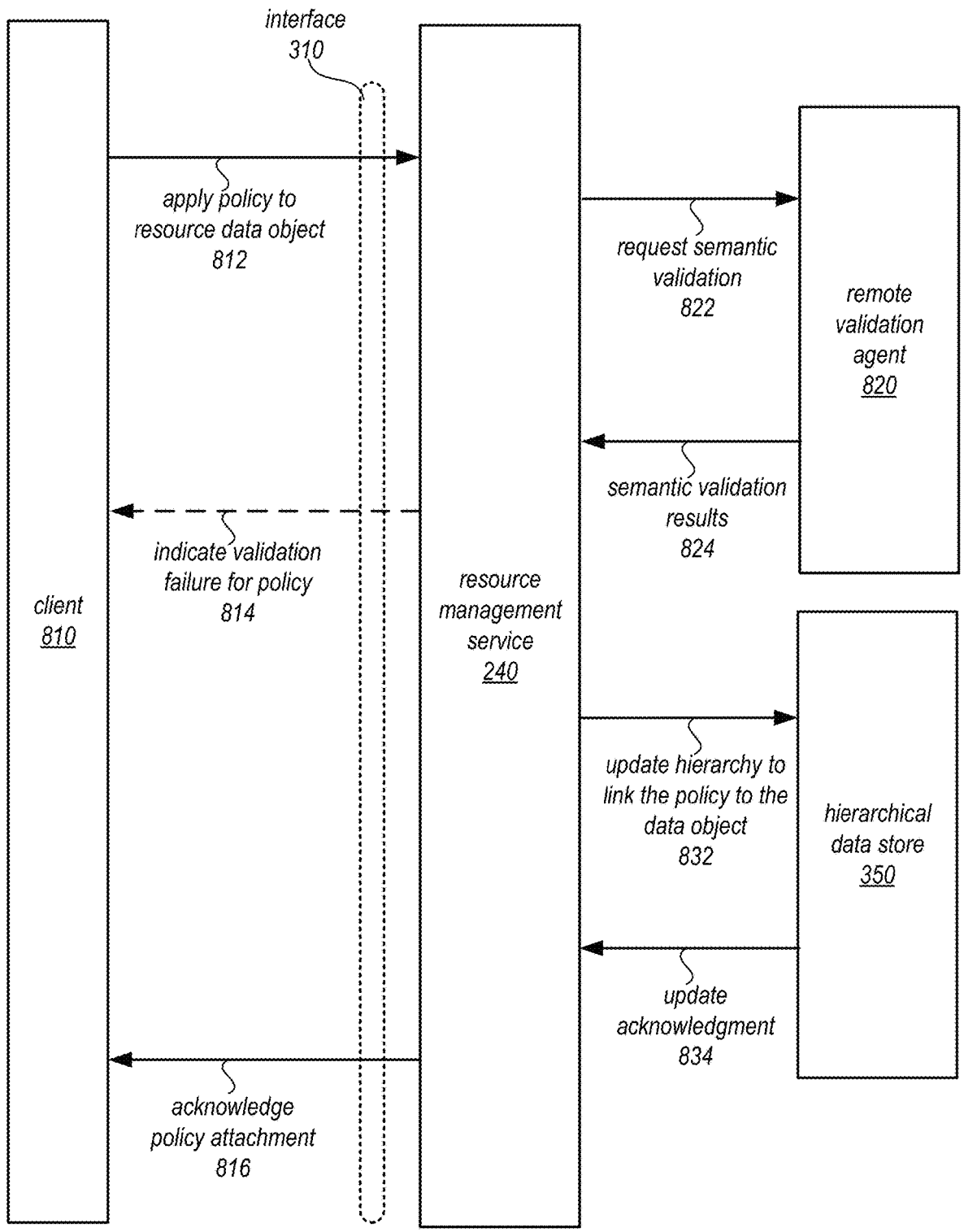
FIG. 8 illustrates interactions to attach policies to resource data objects, according to some embodiments.

FIG. 8 illustrates interactions to attach policies to resource data objects, according to some embodiments. Client 810, which may be the same or different from client 710, may send a request to apply a policy 812 (that has been created, as discussed above in FIG. 7) to a resource data object (e.g., to a group resource data object or an individual resource data object) to resource management service via interface 310. Resource management service 240 may then identify a remote validation agent for the policy (e.g., as may be identified in the policy or policy schema) and send a validation request 822 to remote validation agent 820. For example, the policy or policy schema for the type of policy may include a network endpoint (e.g., a network address, such as an Internet Protocol (IP) address) to which the validation request is sent. In some embodiments, remote validation agent 820 may be preregistered with resource management service 240 so that every time a policy of a policy type associated with remote validation agent 820 is received, the validation request may be sent to remote validation agent 820. The semantic validation request 822 and/or response may be formatted according to an API for validation requests and responses or may be an event or trigger indication configured by the policy or policy schema (e.g., an API request formatted according to an interface for remote validation agent 820). Remote validation agent 820, similar to remote validation agent 720 discussed above in FIG. 7, may be another resource implemented in the provider network, such as a virtual compute instance or server resource configured to handle validation requests from remote management service for the policy type.

Remote validation agent 820 may perform semantic validation with respect to the policy and the attached resource data object. For example, if the attachment to the resource policy gives a resource, such as a compute instance, access to a storage resource, semantic validation may determine wither the identified resource data object is a compute instance, and whether or not an instance of that type is allowed to have access to the storage resource. Semantic validation may validate the content of the policy to determine whether or not the any of the actions or conditions defined in the policy violates any business or operational logic or rules or is otherwise unenforceable. Remote validation agent 820 may send semantic validation results 824 back to resource management service 240. If the semantic validation fails, then resource management service 240 may provide an indication of validation failure for the policy and reject the request to attach the policy to the resource data object. The indication 814 may include validation error information so that corrections to the policy may be made, in some embodiments.

If the policy is determined to be valid, then resource management service 240 may send a request to update a hierarchy in hierarchical data store 350 to link the policy to the data object 832. Hierarchical data store 350 may write the link to the stored hierarchy and return an update acknowledgement 834. In turn, resource management 240 may return an acknowledgement 816 of the policy attachment to client 810.

Figure 9:
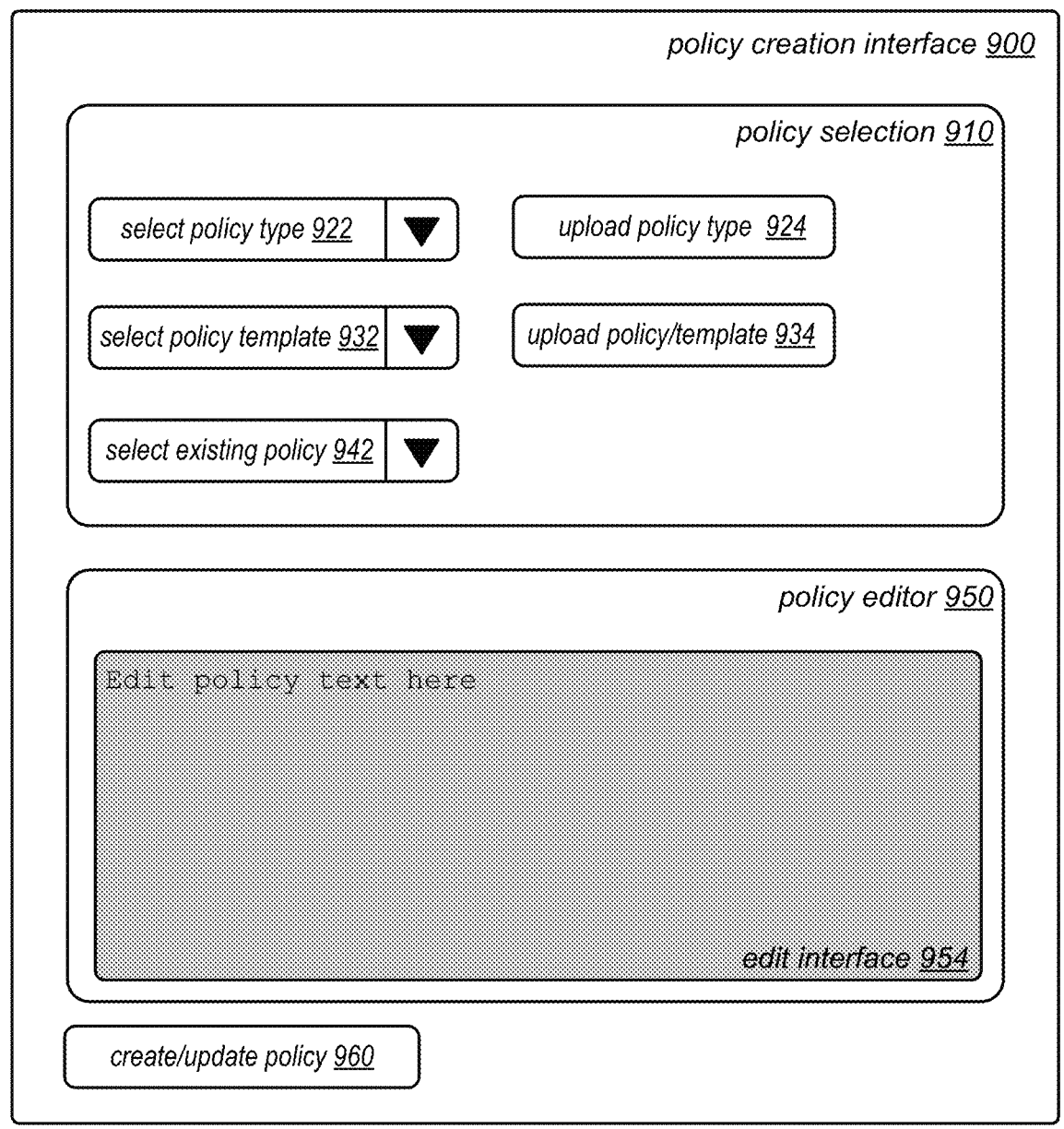
FIG. 9 illustrates an example graphical user interface for creating and editing policies, according to some embodiments.

As noted above, policy types and policies may user authored or specified. In this way custom policies may be both created, managed, and applied to resources in a distributed system, such as provider network 200, as well as being validated according to a custom policy schema for the policy and custom semantic validation rules (e.g., business logic specific to a resource or service implementing a resource to which the policy is applied). FIG. 9 illustrates an example graphical user interface for creating and editing policies, according to some embodiments.

As illustrated in FIG. 9, policy creation interface 900 may be a graphical user interface hosted or provided by a network-based site (e.g., provider network website) or be a local GUI implemented at a client of provider network 200 (e.g., built on top of various APIs of provider network 200). Policy creation interface 900 may implement a policy selection area 910 to display various options for triggering the creation or modification of policies or policy types. For example, select policy type 922 may be a drop down list, search interface, or any other kind of selection user interface component that allows a user to identify an existing policy type. As indicated at 924, users may also select an element to upload a policy type (e.g., create a new policy schema) which can then be selected to create a new policy of that policy type. In some embodiments, policy editor 950 may display in edit interface 954 the policy schema for editing (not illustrated). Selection of the policy type may populate one or more possible policy templates 932 which may be examples of policies that can be configured or filled by a user via edit interface 954. In at least some embodiments, a search interface for existing policy templates (or policy types) may be implemented so that users can identify a policy type or policy template that suits specified resource management needs (e.g., security, storage resources, deployment, networking, payment configuration, etc.). Upload policy/template element 934 may allow users to select a policy template or policy for upload (which may then be edited in edit interface 954. Similarly, select existing policy element 942 may allow users to select a previously created policy and make changes to the policy.

Policy editor 950 may be implemented to provide various policy content editing features, such as a text editor like edit interface 954. To apply changes, including the creation of a new policy, user interface element 960 may be selected. Note however, that in at least some embodiments, policy type creation, policy creation, policy type update, or policy type updates may be performed via a series of user interface elements or windows (e.g., a policy type selection wizard, a policy type creation wizard, a policy type update wizard, a policy template selection wizard, a policy creation wizard, a policy edit wizard, etc.), or some other form or combination of graphical user interface elements and thus FIG. 9 is not intended to be limiting.

Figure 10:
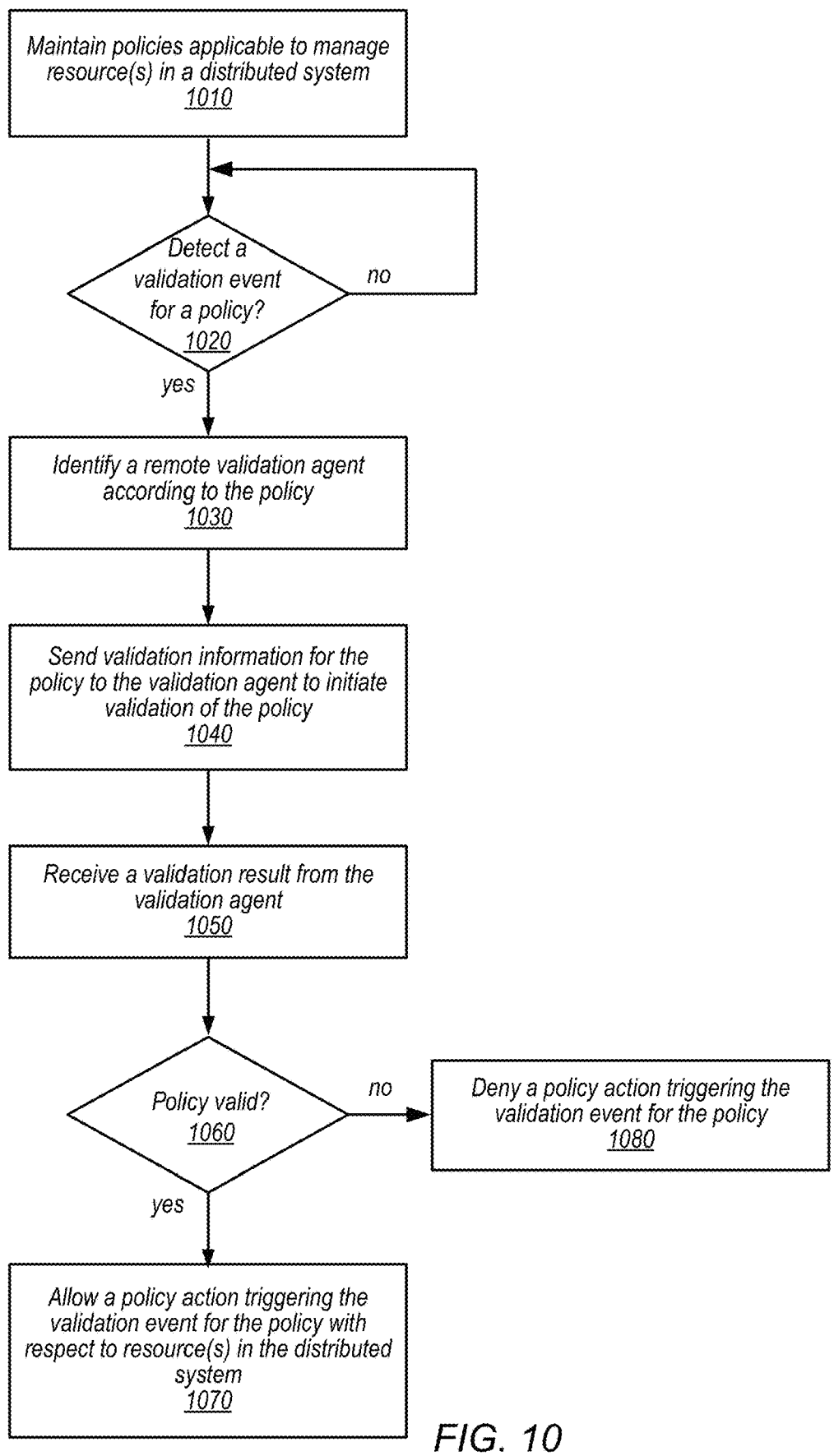
FIG. 10 is a high-level flowchart illustrating methods and techniques to implement remote policy validation for managing distributed system resources, according to some embodiments.

Although FIGS. 2-9 have been described and illustrated in the context of a provider network implementing a resource management service for resources of multiple different services in the provider network, the various components illustrated and described in FIGS. 2-9 may be easily applied to other resource management systems, components, or devices. For example, private systems and networks implementing multiple system resources may maintain remote policy validation for managing the behavior of the system resources. As such, FIGS. 2-9 are not intended to be limiting as to other embodiments of a system that may implement resource management system for system resources. FIG. 10 is a high-level flowchart illustrating methods and techniques to implement remote policy validation for managing distributed system resources, according to some embodiments. Various different systems and devices may implement the various methods and techniques described below, either singly or working together. For example, a resource management service such as described above with regard to FIGS. 2-9 may be configured to implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 1010, policies applicable to manage resource(s) in a distributed system may be maintained. For example, a hierarchical data store, such as discussed above with regard to FIGS. 3-9, may be implemented to maintain resource data objects and policies for managing resources corresponding to the data objects. The maintained policies may be made applicable to a resource by associating the policies with a resource (e.g., creating a link in the hierarchy between the policy and resource data object) so that when a policy consumer (e.g., a system, service, or control that manages the resource) checks to see whether policies are enforced against the resource, the associated policy is identified as applied to the resource. While FIGS. 2-9 discuss utilizing a hierarchical data store to associate policies with resources, various other data structures and/or data stores may be implemented. For example, a table indexed by resource id may be maintained that stores all policies applied to a resource in a row with the resource, so that when the policies associated with the resource need to be determined, the resource id of the resource may be looked up and applied policies read from the row.

A validation event may be detected for one of the policies, as indicated at 1020, in some embodiments. A validation event may be triggered by a policy action (e.g., creation, application, or enforcement) of a policy that results in a validation of the policy. For example, as illustrated in FIG. 7, a validation event may occur when a policy is created. Similarly, as illustrated in FIG. 8, a validation event may occur when a policy is applied (e.g., attached) or enforced (e.g., by a policy consumer, such as another network service that implements the actions specified in the policy when the conditions specified in the policy are satisfied, as discussed above with regard to FIG. 4). A validation event may also be triggered by a policy action resulting from a modification to (or an attempt to modify) a resource (e.g., adding or removing resources from a group or hierarchy).

A remote validation agent may be identified according to the policy, in some embodiments, as indicated at 1030. A remote validation agent may be a remote validation agent implemented remotely (e.g., separated via a network communication) from a resource manager or other system, component, or device that maintains the policies for managing resources in a distributed system. In some embodiments, remote validation agents may be pre-registered to associate the remote validation agent with handling certain types of validation (e.g., syntactic and/or semantic), so that the remote validation agent implements a common interface (e.g., API) format for receiving a validation request and sending validation results. In some embodiments, a remote validation agent may only be specified by a network endpoint (e.g., in a policy or policy schema for the policy). Validation information for the policy may be sent to the validation agent to initiate validation of the policy, as indicated at 1040. Validation information may include policy content, a policy schema, information about the action triggering the validation event (e.g., if a request to apply the policy to a particular resource, validation information may include the identity of and/or information about the particular resource), or any other data for performing a validation. In some embodiments, validation information may include a request for a specific type of validation (e.g., semantic or syntactic) if both may be performed by the remote validation agent. In some embodiments, validation information may include an identifier of the policy, as discussed below with regard to FIG. 11, which the remote validation agent may then be used to obtain appropriate validation information (either from a resource manager or other source).

As indicated at 1050, a validation result may be received from the remote validation agent, in some embodiments. If the validation result indicates that the policy is not valid, as indicated by the negative exit from 1060, then the policy action triggering the validation may be denied, as indicated at 1080. A denial or other failure indication may be provided to a requesting client to block, stop, or disallow the policy action. If the validation result indicates that the policy is valid, as indicated by the positive exit from 1060, then the policy action triggering the validation event with respect to resource(s) in the distributed system may be allowed, as indicated 1070. For example, the requested policy creation, application, or enforcement may proceed.

Figure 11:
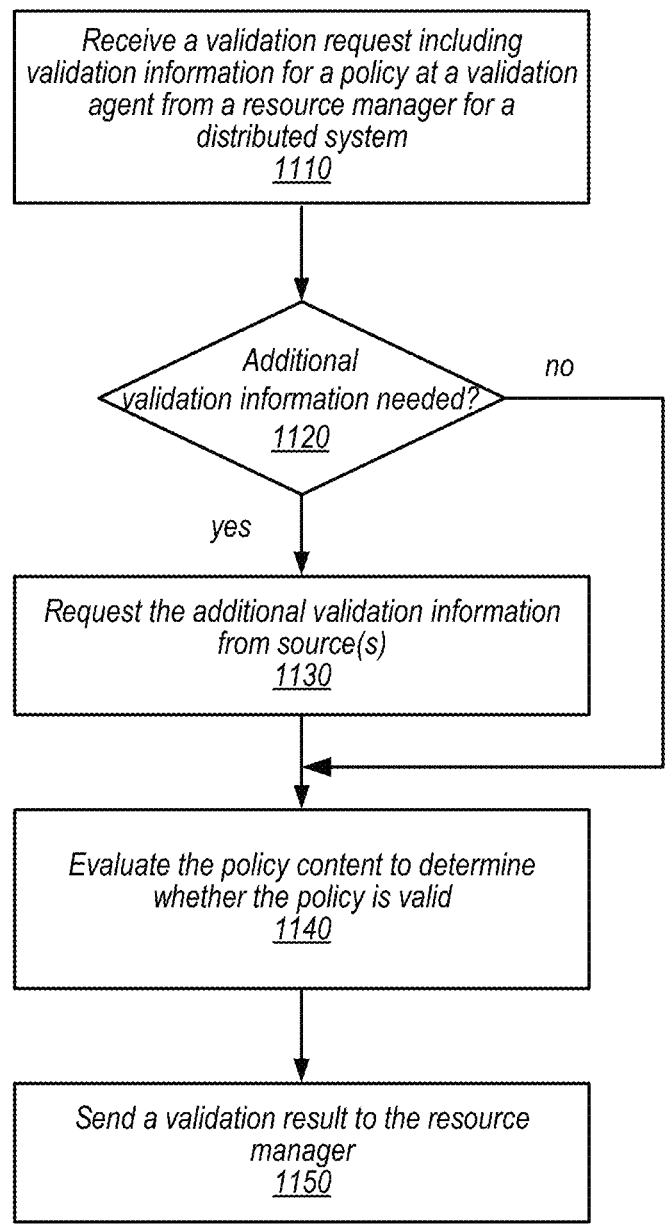
FIG. 11 is a high-level flowchart illustrating methods and techniques to implement policy validation at a remote validation agent, according to some embodiments.

FIG. 11 is a high-level flowchart illustrating methods and techniques to implement policy validation at a remote validation agent, according to some embodiments. As indicated at 1110, a validation request for a policy may be received at a validation agent from a resource manager for a distributed system, in some embodiments. The validation request may include validation information, which as noted above, may include a variety of information, such as policy content, a policy schema, information about the action triggering the validation event (e.g., if a request to apply the policy to a particular resource, validation information may include the identity of and/or information about the particular resource), validation type (e.g., syntactic or semantic) or any other data for performing a validation. In some embodiments, the validation information may not include all the information needed to perform the validation, as indicated at 1120, (e.g., if the validation request includes a policy identifier but no policy content). If not, then the remote validation agent may request additional information from one or more sources (e.g., policy content from the resource manager, information about resources identified in the policy from other network services, such as whether a specified resource id is valid or allowed to perform an action specified by the policy), as indicated at 1130.

As indicated at 1140, the policy content may be evaluated to determine whether the policy is valid. For example, syntactic validation may evaluate whether a policy is syntactically correct with respect to a policy schema of a policy type for the policy so that the policy can be parsed and evaluated by backend systems that lookup the policy, whereas semantic validation may be performed to ensure that policy content is meaningful, and thus enforceable, so that a resource or other information specified in the policy results in a policy that can be enforced. Because remote validation agent may be customized to perform validation based on knowledge that the resource manager does not have (e.g., whether identifiers included in a policy exist, whether the resources identified in the policy can be configured in a particular way, whether a user account can be authorized to access certain information, etc.), remote validation agent may also access or obtain the other information that the resource manager does not have (or understand) (some of which may be obtained as indicated at element 1130 discussed above), in order to perform the validation. Once validation is complete, a validation result may be sent to the resource manager, as indicated at 1150. The result may identify errors in the event that the policy is determined to be invalid.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 12:
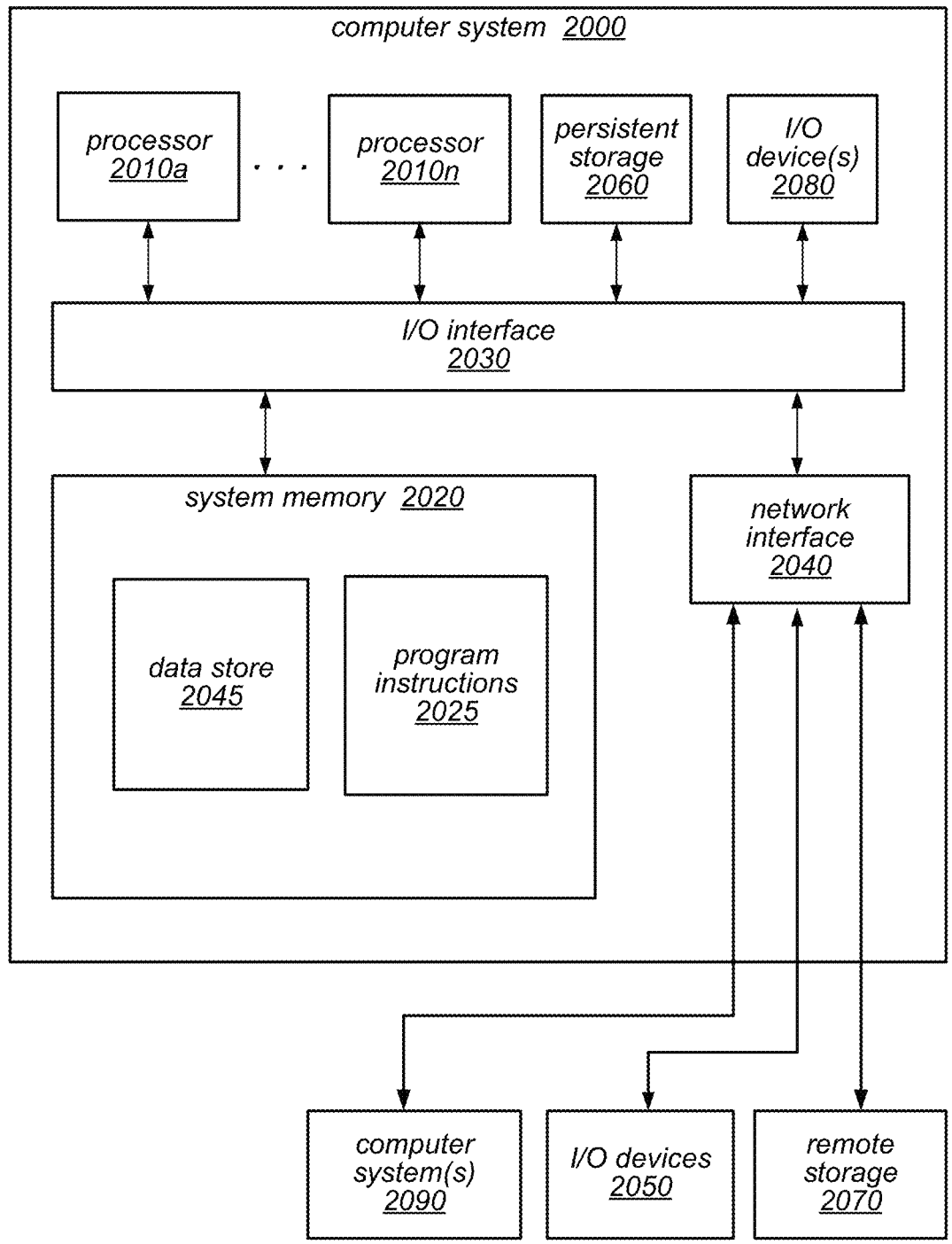
FIG. 12 is an example computer system, according to various embodiments.

FIG. 12 is a block diagram illustrating a computer system configured to implement remote policy validation for managing system resources, according to various embodiments, as well as various other systems, components, services or devices described above. For example, computer system 2000 may be configured to implement various components of a resource management service, hierarchical data store, or other provider network services, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a resource management service or remote validation agent, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the hierarchy storage nodes or transaction log store described herein may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement embodiments described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
  a data store that maintains a hierarchy of resource data objects, wherein the hierarchy of the resource data objects identifies policies applicable to the behavior of resources corresponding to the resource data objects in the system and groups the policies based on their respective policy types;
  at least one processor and a memory storing program instructions that cause the at least one processor to implement a system resource manager, configured to:
    receive a request to apply a policy to an identified one of the resource data objects corresponding to one of the resources in the system, and in response:
      identify a remote validation agent implemented remotely from the system resource manager to validate the policy according to a policy type of the policy, wherein the policy type is determined from the hierarchy maintained in the data store, the remote validation agent is associated with the policy type, and validation of the policy includes evaluating the policy for syntactic or semantic errors;
      send a validation request to a network address or endpoint associated with the remote validation agent, wherein the validation request causes the remote validation agent to initiate a validation of the policy, and the validation request includes validation information for the policy;

in response to the validation request, receive a validation result from the remote validation agent that indicates that the policy is valid; and upon receipt of the validation result that indicates that the policy is valid, apply the policy to the one resource data object.

2. The system of claim 1, wherein the system resource manager is further configured to:

prior to the receipt of the request to apply the policy:

receive a request to create the policy;

send a request to initiate a syntactic validation of the policy to the same remote validation agent or a different remote validation agent;

receive a different validation result from the same remote validation agent or the different remote validation agent that was sent the request to initiate syntactic validation, wherein the different validation result indicates that the policy is syntactically valid; and create a policy object in the data store that is available for application.

3. The system of claim 1, wherein the data store is a hierarchical data store, and wherein to apply the policy to the one resource data object, the system resource manager is configured to link a policy data object for the policy in the hierarchical data store to the one resource data object.

4. The system of claim 1, wherein the system is a provider network that implements a plurality of different network-based services, wherein the resources are implemented as part of the different network-based services, and wherein the system resource manager is implemented as another one of the network-based services.

5. A method, comprising:

performing, by one or more computing devices that implement a resource manager for a distributed system:

detecting a policy validation event for a policy applicable to manage one or more resources in the distributed system, wherein respective resource data objects corresponding to a plurality of resources in the distributed system including the one or more resources are maintained in a hierarchical data structure in a hierarchical data store, wherein the respective resource data objects identify policies including the policy applicable to the resources in the distributed system, and wherein the hierarchical data structure groups the policies based on their respective policy types;

identifying a remote validation agent implemented remotely from the resource manager to validate the policy according to a policy type of the policy, wherein the policy type is determined from the hierarchical data structure, the remote validation agent is associated with the policy type, and validation of the policy includes evaluating the policy for syntactic or semantic errors;

sending a validation request to a network address or endpoint associated with the remote validation agent, wherein the validation request causes the remote validation agent to perform a validation of the policy, and the validation request includes validation information for the policy;

in response to the validation request, receiving a validation result from the remote validation agent; and allowing or denying a policy action that triggered the policy validation event according to the received validation result.

6. The method of claim 5, wherein the validation of the policy initiated at the remote validation agent is a semantic policy evaluation that evaluates content of the policy to determine whether the policy is enforceable.

7. The method of claim 5, further comprising:

performing, by one or more other computing device implementing the remote validation agent:

receiving the validation information for the policy;

evaluating the policy based, at least in part, on the validation information to determine whether the policy is valid; and sending the validation result to the resource manager indicating whether the policy is valid.

8. The method of claim 7, further comprising:

prior to evaluating the policy, obtaining, by the remote validation agent, additional information for the policy from one or more sources.

9. The method of claim 8, wherein at least one of the one or more sources is the resource manager.

10. The method of claim 5, wherein the policy validation event is triggered in response to an attempt to modify of one of the resources, and wherein the policy action allows or denies the modification to the resource.

11. The method of claim 5, wherein the policy indicates one of synchronous or asynchronous processing behavior for the validation of the policy.

12. The method of claim 5, further comprising the resource manager tracking a state of the validation of the policy and sending the state to a client associated with the policy validation event.

13. The method of claim 5, wherein the validation result indicates that the policy is valid, and wherein allowing or denying a policy action that triggered the policy validation event according to the received validation result comprises:

upon determining that the policy is valid, updating the hierarchical data structure to store a policy data object corresponding to the policy or link a policy data object to at least one of the respective resource data objects in the hierarchical data structure.

14. A non-transitory, computer-readable storage medium, storing program instructions that when executed by one or more computing devices to implement a resource manager for a distributed system and cause the resource manager to implement:

detecting a policy validation event for a policy applicable to manage one or more resources in the distributed system, wherein respective resource data objects corresponding to a plurality of resources in the distributed system including the one or more resources are maintained in a hierarchical data structure in a hierarchical data store, wherein the respective resource data objects identify policies including the policy applicable to the resources in the distributed system, and wherein the hierarchical data structure groups the policies based on their respective policy types;

identifying a remote validation agent implemented remotely from the resource manager to validate the policy according to a policy type of the policy, wherein the policy type is determined from the hierarchical data structure, the remote validation agent is associated with the policy type, and validation of the policy includes evaluating the policy for syntactic or semantic errors;

sending a validation request to a network address or endpoint associated with the remote validation agent, wherein the validation request causes the remote validation agent to perform a validation of the policy, and the validation request comprises validation information for the policy;

in response to the validation request, receiving a validation result from the remote validation agent; and allowing or denying a policy action that triggered the validation event for the policy according to the validation result.

15. The non-transitory, computer-readable storage medium of claim 14, wherein the policy type is one of a plurality of policy types, and wherein the validation of the policy initiated at the remote validation agent is a syntactic policy evaluation that evaluates the policy with respect to a policy schema for the policy type to determine whether the policy conforms to the policy schema.

16. The non-transitory, computer-readable storage medium of claim 14, wherein the validation of the policy initiated at the remote validation agent is a semantic policy evaluation that evaluates content of the policy to determine whether the policy is enforceable.

17. The non-transitory, computer-readable storage medium of claim 14, wherein the policy action is an action to create the policy, wherein the validation result indicates that the policy is valid, and wherein, in allowing or denying a policy action that triggered the policy validation event according to the received validation result, the program instructions cause the one or more computing devices to implement:

upon determining that the policy is valid, storing the policy.

18. The non-transitory, computer-readable storage medium of claim 14, wherein the program instructions cause the one or more computing devices to further implement:

tracking a state of the validation of the policy; and sending the state to a client associated with the policy validation event.

19. The non-transitory, computer-readable storage medium of claim 14, wherein the policy action is an action to enforce the policy, wherein the validation result indicates that the policy is valid, and wherein, in allowing or denying a policy action that triggered the policy validation event according to the received validation result, the program instructions cause the one or more computing devices to implement:

upon determining that the policy is valid, enforcing the policy with respect to a least one of the one or more resources.

20. The non-transitory, computer-readable storage medium of claim 14, wherein the distributed system is a provider network that implements a plurality of different network-based services, wherein the one or more resources are implemented as part of the different network-based services, and wherein the resource manager for the distributed system is implemented as another one of the network-based services.

* * * * *